US010904769B2

(12) United States Patent
Cho (10) Patent No.: US 10,904,769 B2
(45) Date of Patent: Jan. 26, 2021

(54) METHOD, STORAGE MEDIUM, AND ELECTRONIC DEVICE FOR WIRELESS NETWORK DESIGN

(71) Applicant: Samsung Electronics Co., Ltd., Suwon-si (KR)

(72) Inventor: Minsung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 16/438,950

(22) Filed: Jun. 12, 2019

(65) Prior Publication Data
US 2020/0015095 A1      Jan. 9, 2020

(30) Foreign Application Priority Data

Jul. 5, 2018   (KR) .................... 10-2018-0078101

(51) Int. Cl.
| | |
|---|---|
| *H04W 16/18* | (2009.01) |
| *H04L 12/24* | (2006.01) |
| *G06F 16/28* | (2019.01) |
| *G06F 16/29* | (2019.01) |
| *H04W 88/08* | (2009.01) |

(52) U.S. Cl.
CPC .......... *H04W 16/18* (2013.01); *G06F 16/285* (2019.01); *G06F 16/29* (2019.01); *H04L 41/0813* (2013.01); *H04W 88/08* (2013.01)

(58) Field of Classification Search
None
See application file for complete search history.

(56) References Cited

U.S. PATENT DOCUMENTS

| | | |
|---|---|---|
| 2005/0090217 A1 | 4/2005 | Zhu |
| 2010/0232529 A1 | 9/2010 | Fettweis et al. |
| 2012/0002603 A1 | 1/2012 | Lohr et al. |
| 2013/0039390 A1 | 2/2013 | Vallette |
| 2014/0106776 A1 | 4/2014 | Levin et al. |
| 2018/0176797 A1* | 6/2018 | Barros ................. H04W 16/28 |
| 2019/0066391 A1* | 2/2019 | Anderson .............. G06T 15/06 |
| 2019/0342763 A1* | 11/2019 | Jung ................. H04B 17/3913 |
| 2020/0050550 A1* | 2/2020 | Muthler .............. G06F 12/0875 |

FOREIGN PATENT DOCUMENTS

KR   10-1999-0049881 A    7/1999

OTHER PUBLICATIONS

International Search Report dated Sep. 11, 2019, issued in an International application No. PCT/KR2019/006717.

\* cited by examiner

*Primary Examiner* — Otis L Thompson, Jr.
(74) *Attorney, Agent, or Firm* — Jefferson IP Law, LLP (57) ABSTRACT

A method for wireless network design and an apparatus therefor are provided. The method includes receiving a ray path analysis request for a target area for a wireless network design, configuring a first area corresponding to an analysis range of the target area, in consideration of a position of a first base station (BS) and a direction of a ray transmitted by the first BS, configuring a second area along a layout of a first road running on a line extended from the first BS, within a range of the configured first area, performing analysis on a path of the ray transmitted by the first BS in the second area, and transmitting a result of the analysis.

20 Claims, 7 Drawing Sheets
(2 of 7 Drawing Sheet(s) Filed in Color)

METHOD, STORAGE MEDIUM, AND ELECTRONIC DEVICE FOR WIRELESS NETWORK DESIGN

CROSS-REFERENCE TO RELATED APPLICATION(S)

This application is based on and claims priority under 35 U.S.C. §119(a) of a Korean patent application number 10-2018-0078101, filed on Jul. 5, 2018, in the Korean Intellectual Property Office, the disclosure of which is incorporated by reference herein in its entirety.

BACKGROUND

1. Field

The disclosure relates to a method, storage medium, and electronic device for a wireless network design. More particularly, the disclosure relates to a method, storage medium, and electronic device for performing wireless network design based on a morphology.

2. Description of Related Art

To satisfy the demands for wireless data traffic, which have been increasing since the commercialization of a $4^{th}$ generation (4G) communication system, efforts have been made to develop a $5^{th}$ generation (5G) or pre-5G communication system. That's why the 5G or pre-5G communication system is called a beyond 4G or post long term evolution (LTE) system.

To achieve high data rates, deployment of the 5G communication system in an ultra-high frequency (mmWave) band (for example, 60 GHz) is under consideration. Techniques including beamforming, massive multiple input multiple output (MIMO), full dimensional MIMO (FD-MIMO), array antenna, analog beamforming, and large scale antenna have been discussed for the 5G communication system in order to mitigate the path loss of waves and increase the propagation distance of waves in the ultra-high frequency band.

Further, for system network improvement, technologies such as evolved small cell, advanced small cell, cloud radio access network (RAN), ultra-dense network, device-to-device (D2D) communication, wireless backhaul, moving network, cooperative communication, coordinated multi-point (CoMP), and received interference cancellation are under development in the 5G communication system.

Besides, hybrid FSH and QAM modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes, have been developed in the 5G communication system.

Technologies for satisfying main performance indexes of enhanced mobile broadband (eMBB), ultra reliable low latency communication (URLLC), and massive machine type communication (mMTC) as main use scenarios of 5G new radio (NR) are under development.

When a mobile communication system is designed, a network design scheme is performed, in which base stations (BSs) are efficiently deployed by analyzing the coverage of waves in a wide area.

Ray tracing is a simulation method of tracing the path of a ray transmitted by a BS. Since simulation is to be performed for all possible ray paths, very much time is taken for analysis for a wireless network design.

That is, all possible ray paths should be traced one by one, and the resulting tracing values should be calculated in ray tracing. Therefore, analysis time is inefficient, and repeated analysis for various wireless network design methods is difficult.

In an environment in which the complexity of ray path tracing increases gradually with the number of structures, there is a need for a method of efficiently designing a wireless network.

In a millimeter wave (mmWave) network for 5G communication, a ray propagation distance is short in an ultra-high frequency band in view of the frequency characteristics of the ultra-high frequency band, compared to a legacy band, and ray loss such as path loss and reflection loss increases relative to the legacy band, due to the influence of objects on the ground such as trees or street lamps. The resulting large difference between arrived signals according to deployments of objects on the ground, and the resulting relatively decreased ray propagation distance lead to reduction of service coverage.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to perform wireless network design based on a morphology.

According to an embodiment of the disclosure, in analysis for a wireless network design, time taken for the analysis is shortened by configuring an effective area based on morphology and analyzing the configured effective area, thereby enabling analysis for various cases of wireless network designs.

According to an embodiment of the disclosure, as analysis is repeatedly performed in consideration of the installation positions, installation directions, or number of base stations (BSs) in each of various cases, various cases of wireless network designs are considered, and thus optimized BS deployment is derived.

According to an embodiment of the disclosure, as similar morphologies are grouped and a morphology database is built with the morphology groups, data about a stored similar morphology group is applied to a target analysis area. Therefore, the economic feasibility of analysis may be increased.

Additional aspects will be set forth in part in the description which follows and, in part, will be apparent from the description, or may be learned by practice of the presented embodiments.

In accordance with an aspect of the disclosure, a wireless network design method is provided. The method includes receiving a ray path analysis request for a target area for a wireless network design, configuring a first area corresponding to an analysis range of the target area, in consideration of a position of a first base station (BS) and a direction of a ray transmitted by the first BS, configuring a second area along a layout of a first road running on a line extended from the first BS, within a range of the configured first area, performing analysis on a path of the ray transmitted by the first BS in the second area, and transmitting a result of the analysis.

The first area may be configured based on an area in which a dominant signal of the ray transmitted by the first BS reaches.

The wireless network design method may further include re-performing the configuration of the first area, the configuration of the second area, and the analysis of the path of the ray by re-configuring the position of the first BS or the direction of the ray transmitted by the first BS to be different.

The wireless network design method may further include configuring a position of the second BS and a direction of a ray transmitted by the second BS, along the second area, configuring a third area for analysis on a path of the ray transmitted by the second BS, in consideration of the position of the second BS and the direction of the ray transmitted by the second BS, and performing analysis on the path of the ray transmitted by the second BS in the third area. The position of the second BS may be determined based on a layout of a second road connected to the first road and forked off from the first road.

The third area may be configured based on an area in which a dominant signal of the ray transmitted by the second BS reaches.

The wireless network design method may further include re-configuring the third area and re-performing analysis of the path of the ray by re-configuring the position of the second BS or the direction of the ray transmitted by the second BS to be different.

The wireless network design method may further include constructing a map database based on one or more of a vector map, a satellite map, or a satellite picture, extracting road information from the map database, constructing a morphology database by calculating neighboring morphology information per extracted road information, and generating morphology group information by grouping similar morphologies into one group based on the morphology database.

The wireless network design method may further include storing the result of the analysis for the target area in the morphology database based on morphology group information of the target area for the wireless network design.

The performing of analysis on the path of the ray in the second BS may include performing simulation for tracing a ray path within a range of the second area, or extracting a result of analysis performed for the same morphology group as for the second area from the morphology database, and applying the extracted analysis result as an analysis result of the second area.

The performing of analysis on the path of the ray in the third BS may include performing simulation for tracing a ray path within a range of the third area, or extracting a result of analysis performed for the same morphology group as for the third area from the morphology database, and applying the extracted analysis result as an analysis result of the third area.

The wireless network design method may further include generating a candidate BS list based on the morphology group information, setting different combinations of the first BS and second BSs from a plurality of BSs included in the candidate BS list, and performing analysis on each of the combinations, and determining one of the combinations based on results of analysis on the combinations, for the wireless network design.

In accordance with another aspect of the disclosure, an electronic device for performing a wireless network design is provided. The electronic device includes a transceiver, a memory, and at least one processor electrically coupled to the transceiver and the memory. The at least one processor is configured to receive a ray path analysis request for a target area for the wireless network design through the transceiver, configure a first area corresponding to an analysis range of the target area, in consideration of a position of a first BS and a direction of a ray transmitted by the first BS, configure a second area along a layout of a first road running on a line extended from the first BS, within a range of the configured first area, to perform analysis on a path of the ray transmitted by the first BS in the second area, and transmit a result of the analysis through the transceiver.

In accordance with another aspect of the disclosure, a non-transitory computer-readable recording medium having an executable program recorded thereon for performing a wireless network design method, wherein the program, when executed by a computer, instructs the computer to perform the wireless network design method is provided. The wireless network design method includes receiving a ray path analysis request for a target area for a wireless network design, configuring a first area corresponding to an analysis range of the target area, in consideration of a position of a first BS and a direction of a ray transmitted by the first BS, configuring a second area along a layout of a first road running on a line extended from the first BS, within a range of the configured first area, performing analysis on a path of the ray transmitted by the first BS in the second area, and transmitting a result of the analysis.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted.

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the disclosure will be described in detail with reference to the attached drawings. A detailed description of a generally known function or structure of the disclosure will be avoided lest it should obscure the subject matter of the disclosure. Although the terms used in the disclosure are defined in consideration of functions in the embodiments of the disclosure, the terms may be changed according to the intention of a user or an operator, or customs. Therefore, the disclosure should be understood, not simply by the actual terms used but by the meaning of each term lying within.

Before a detailed description of the disclosure, example definitions for some terms used herein and that are interpretable are presented below. These terms should not be construed as limiting the disclosure.

An electronic device is an entity that communicates with another device or a base station (BS). The electronic device may also be referred to as user equipment (UE), mobile equipment (ME), a mobile station (MS), a device, a terminal, and so on. Further, a UE may conceptually cover an internet of things (IoT) UE, a fast driving vehicle, and a UE mounted in a vehicle.

A BS is an entity that communicates with a UE, also referred to as a Node B (NB), an evolved Node B (eNode B or eNB), an access point (AP), and so on.

A signal may be a ray radiated from an antenna of a BS, and received at an antenna of a UE.

An analysis method for a wireless network design according to the disclosure may be applied to beamforming for $5^{th}$ generation (5G) communication in a millimeter wave (mmWave) band.

According to an embodiment of the disclosure, a morphology refers to a group of regional features for use in designing a wireless network, which is a zone formed according to a natural environment, topographical features, house structures, and layout features.

Figure 1A:
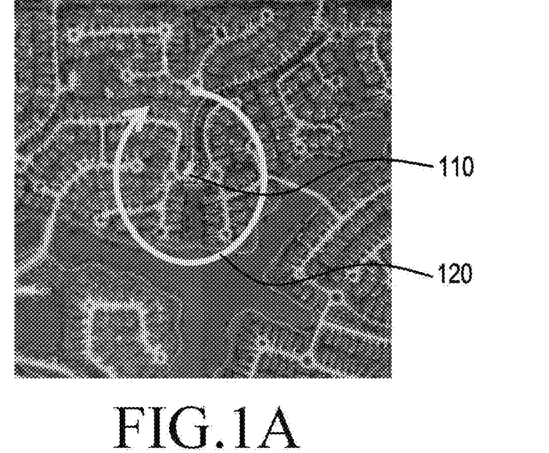
FIGS. 1A and 1B are diagrams illustrating a ray tracing method and a morphology-based effective area analysis method according to various embodiments of the disclosure.
Figure 1B:
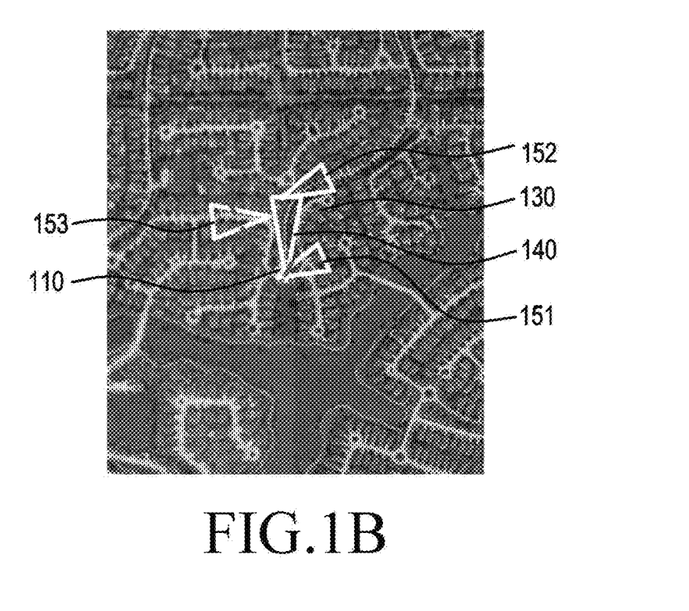

FIGS. 1A and 1B are diagrams illustrating a ray tracing method, and an exemplary morphology-based effective area analysis method according to an embodiment of the disclosure.

According to an embodiment of the disclosure, ray tracing is a technique of tracing possible ray paths in consideration of factors that affect rays, such as ambient environmental information including building information, the position of a transmission antenna, and antenna characteristics.

In the ray tracing method according to an embodiment, the attenuation of a ray in each ray path may be calculated by estimating reflection or diffraction of traced ray paths. According to the ray tracing method, therefore, propagation loss may also be determined by calculating the attenuation of a ray in every possible path from a transmission antenna to a reception position.

For example, propagation loss may be estimated and the coverage of rays transmitted by a BS may be determined, by determining a traveling path of reflected waves or diffracted waves according to topography or a building layout around the BS. Referring to the analysis method for a wireless network design illustrated in FIGS. 1A and 1B, a wireless network may be designed by analyzing the direction and strength of a signal transmitted by a BS and the received power or arrival time of the signal at a point where the signal transmitted by the BS arrives, on the assumption that the BS is installed at a position 110 in FIGS. 1A and 1B.

In a wireless network system, propagation characteristics vary according to environmental information about an area in which rays are transmitted by a BS, that is, the characteristics of objects on the ground, the sizes, materials, altitudes, and density of buildings, or the shapes and widths of roads in a target area. That is, rays transmitted by the BS are reflected or diffracted from objects on the ground, such as a building, a street lamp, or a tree, and suffer from attenuation.

Accordingly, an efficient wireless network design may be performed by simulation or analysis of a target area for the wireless network design.

FIGS. 1A and 1B illustrate different analysis methods applied to the same target area according to various embodiments of the disclosure.

For the convenience of description, it may be assumed that target areas are identical in morphology such as natural environments or topographical features, except for road distributions or distributions of objects on the ground.

FIG. 1A is a diagram illustrating ray tracing according to an embodiment of the disclosure.

Referring to FIG. 1A, the ray tracing is a technique of tracing paths in all directions 120 with respect to the position 110 at which a BS is assumed to be installed. In the ray tracing method, all ray paths in each direction are traced. A ray path in a direction is traced to the end of ray propagation, that is, to a point where the level of a ray transmitted by the BS is 0.

The analysis method based on the ray tracing method illustrated in FIG. 1A takes very much time for per-direction analysis because rays paths in all directions from the BS are traced, and analysis is performed up to a point which a ray does not reach from any direction any further, without limiting a target area for analysis of rays transmitted by the BS. Accordingly, the ray tracing method illustrated in FIG. 1A makes repeated analysis difficult due to much time taken for analysis of the installation position of each BS. Therefore, it is not easy to design various cases of wireless network designs in the mmWave 5G system.

FIG. 1B is a diagram illustrating a morphology-based effective area analysis method according to an embodiment of the disclosure.

In the morphology-based effective area analysis method according to the embodiment of the disclosure, an effective area 130 is configured around the position 110 where the BS is assumed to be installed, and only the effective area 130 may be analyzed.

According to an embodiment of the disclosure, the effective area for analysis may be configured in consideration of the actual scan range of the BS. That is, the effective area 130 according to an embodiment may be configured to be an area reachable by a dominant signal within the antenna range of the BS.

Referring to FIG. 1B, an area reachable by a dominant one of the signals transmitted by the BS may be estimated with respect to the position 110 where the BS is assumed to be installed, and configured as the effective area 130.

If with an upward direction assumed to be north in FIG. 1B, the BS is installed due north at the position 110, the effective area 130 may be configured as indicated by a dotted triangle (effective area 130), taking into account that a dominant one of signals transmitted by the BS reaches mainly within the dotted triangle (effective are 130).

In the disclosure, when it is said that a BS is installed due north, a ray transmitted by the BS is directed due north.

According to an embodiment, the effective area 130 may be determined by estimating an area in which a dominant one of signals transmitted by the BS reaches, in consideration of one or more of the installation position, installation direction, and ambient topography of the BS, information about buildings around the BS, or environmental information about a target analysis area.

According to an embodiment of the disclosure, the effective area 130 may be configured to limit an analysis range in a target area subjected to analysis for a wireless network design.

In order to overcome the drawback of the analysis method based on the ray tracing method illustrated in FIG. 1A that much time is taken for analysis due to analysis of all paths around a BS, the disclosure provides an effective area analysis method for increasing the efficiency of a wireless network design.

The effective area analysis method according to an embodiment of the disclosure enables repeated analysis of various cases by configuring an effective analysis range for a wireless network design with respect to the installation position of each BS, and thus shortening time taken for analysis of rays transmitted by the BS.

In an mmWave network, since ray signals are very different according to the layout of objects on the ground in view of ray propagation characteristics such as diffraction, the signal difference may increase between an area with a road and an area outside a road on the morphology in which a BS is deployed. Therefore, signals propagated from the BS may be centered on the area with a road on the morphology.

According to an embodiment of the disclosure, analysis may be performed based on roads within the configured effective area 130.

Referring to FIG. 1B, on the assumption that the BS is installed due north at the position 110, a simulation area 140 may be configured in an area in which a road running due north from the BS is located, within the effective area 130.

The simulation area 140 is an area representing a target analysis path for analyzing the paths of rays transmitted by the BS, which may be configured along an area in which a road runs on a line extended from the BS.

As described before, rays transmitted from the BS may be reflected or diffracted from an object on the ground, such as a building. Therefore, the rays transmitted from the BS may be propagated along a road without objects on the ground.

With reference back to FIG. 1B, if the BS is installed due north at the position 110 as described before, a ray transmitted from the BS may be propagated along a main road running on a line extended from the BS, and thus a dominant signal of rays transmitted from the BS may be propagated along the main road on the line extended from the BS.

Once the simulation area 140 is configured in the effective area 130, the simulation area 140 may be analyzed. According to an embodiment of the disclosure, when the simulation area 140 is analyzed, the afore-described ray tracing may be used to simulate ray paths.

Unlike the ray tracing method illustrated in FIG. 1A, the ray tracing method for the simulation area 140 may trace paths within the effective area 130. That is, as described before with reference to FIG. 1A, a path is traced in a corresponding direction to the end of ray propagation in the ray tracing method illustrated in FIG. 1A, whereas only ray paths within the simulation area 140 may be traced in the ray tracing method performed for the simulation area 140 in FIG. 1B.

Therefore, the morphology-based effective area analysis method according to the embodiment of the disclosure may efficiently analyze ray paths as well as shorten an analysis time taken for simulation for a wireless network design.

According to another embodiment of the disclosure, the simulation area 140 may be analyzed based on a pre-constructed morphology database (DB). For example, a morphology group similar to the morphology of the simulation area 140 may be extracted from the morphology DB that stores road information or morphology information, and simulation results stored for the morphology group may be reflected in the analysis of the simulation area 140.

According to an embodiment of the disclosure, additional analysis may be performed on the assumption that a virtual BS is installed within the range of a mother BS.

The mother BS according to an embodiment of the disclosure is a BS that transmits a ray to be analyzed. The mother BS may be the BS installed at the position 110 in FIG. 1B, and the virtual BS may be a virtual BS which is assumed to be installed, for analysis of paths of rays transmitted by the mother BS.

As described before, a ray transmitted from the BS may be propagated along the layout of a main road running on a line extended from the BS.

According to an embodiment, one or more roads may be forked off from the main road. For the convenience of description, a road forked off from a main road is referred to as a sub-road.

If one or more sub-roads run from a main road connected to a BS, a part of the rays transmitted by the BS may travel along the main road and then the one or more sub-roads.

Accordingly, in order to analyze propagation paths of rays traveling along a sub-road as described above, it may be assumed that a virtual BS has been installed and rays in the area of the virtual BS may be analyzed in the effective area analysis method according to the embodiment of the disclosure.

According to an embodiment, it may be assumed that the virtual BS is installed according to the layout of a main road running on a line extended from the mother BS.

Further, the installation position of the virtual BS may be assumed with respect to a point at which the main road is branched into the sub-road.

Referring to FIG. 1B, areas in which signals may be additionally spread with respect to the simulation area 140 for the mother BS at the position 110 may be configured as virtual BS areas 151, 152, and 153. That is, on the assumption that three virtual BSs are additionally installed in the simulation area 140 of FIG. 1B, the virtual BS areas 151, 152, and 153 may be configured as areas in which signals propagated from the virtual BSs are analyzed.

Referring to FIG. 1B, it may be noted that the simulation area 140 is configured along the main road connected to the mother BS at the position 110, and the virtual BS areas 151, 152, and 153 are configured along three sub-roads forked off from the main road.

According to an embodiment, the virtual BS areas 151, 152, and 153 may correspond to target virtual BS analysis areas, for analysis of paths of rays transmitted from each virtual BS.

According to an embodiment, the virtual BS areas 151, 152, and 153 may be configured in consideration of the installation positions or directions of virtual BSs, and based on roads running on lines extended from the virtual BSs.

In the disclosure, the installation direction of a BS may refer to a direction in which a ray is transmitted from the BS.

According to an embodiment of the disclosure, the virtual BS areas 151, 152, and 153 may be analyzed by ray tracing-based simulation, as in the analysis of the simulation area 140. In this case, paths of rays transmitted from the respective three virtual BSs may be traced in the respective virtual BS areas 151, 152, and 153.

According to another embodiment of the disclosure, the virtual BS areas 151, 152, and 153 may be analyzed based on a pre-constructed morphology DB. For example, morphology groups similar to the morphologies of the virtual BS areas 151, 152, and 153 may be extracted from the morphology DB storing road information or morphology information, and simulation results stored for the morphology groups may be reflected in the analysis of the virtual BS areas 151, 152, and 153.

According to an embodiment, weights may be assigned to the virtual BSs based on morphologies including the above-described road structure. That is, a weight may be determined for each virtual BS by comparing a morphology related to the mother BS with the morphology of the virtual BS.

According to an embodiment, if weights are assigned to the virtual BSs, the analysis of the virtual BS areas 151, 152, and 153 may be performed by setting initial values reflecting the weights determined for the respective virtual BSs and performing simulation based on the initial values.

According to an embodiment of the disclosure, analysis for a wireless network design may be performed in consideration of a change in a beamforming azimuth. In this case, the morphology-based effective area analysis method illustrated in FIG. 1B may be repeatedly performed according to the direction of the scan range of the BS, while changing the direction of the scan range of the BS.

For example, although the effective area 130, the simulation area 140, and the virtual BS areas 151, 152, and 153 have been configured on the assumption that the BS is installed due north in FIG. 1B, if the change of the beamforming azimuth is considered, the effective area, the simulation area, and the virtual BS areas may be reconfigured and each of the areas may be simulated, on the assumption that the BS is installed in any other direction than due north.

According to an embodiment of the disclosure, the morphology-based effective area analysis method may be repeatedly performed by setting parameters to different values, such as the installation positions, directions, or number of BSs.

That is, according to an embodiment of the disclosure, as various cases of wireless network designs are considered by repeatedly analyzing each of the cases in consideration of the installation positions, directions, or number of BSs in the case, optimized BS deployment may be derived.

Now, a description will be given of path loss of rays based on a morphology with reference to FIGS. 2A and 2B.

Figure 2A:
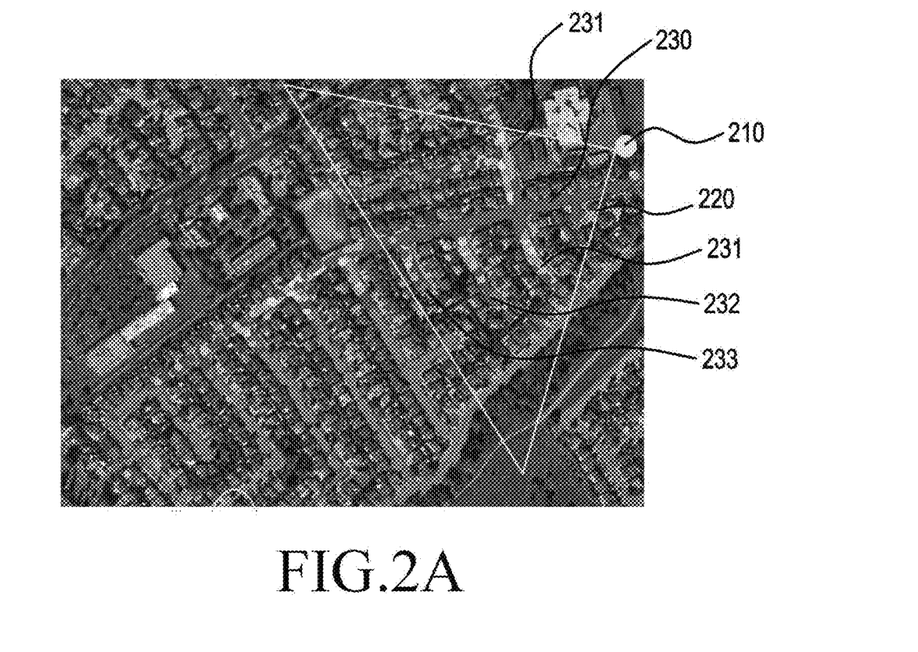
FIGS. 2A and 2B are diagrams illustrating measured data for ray path loss according to various embodiments of the disclosure.
Figure 2B:
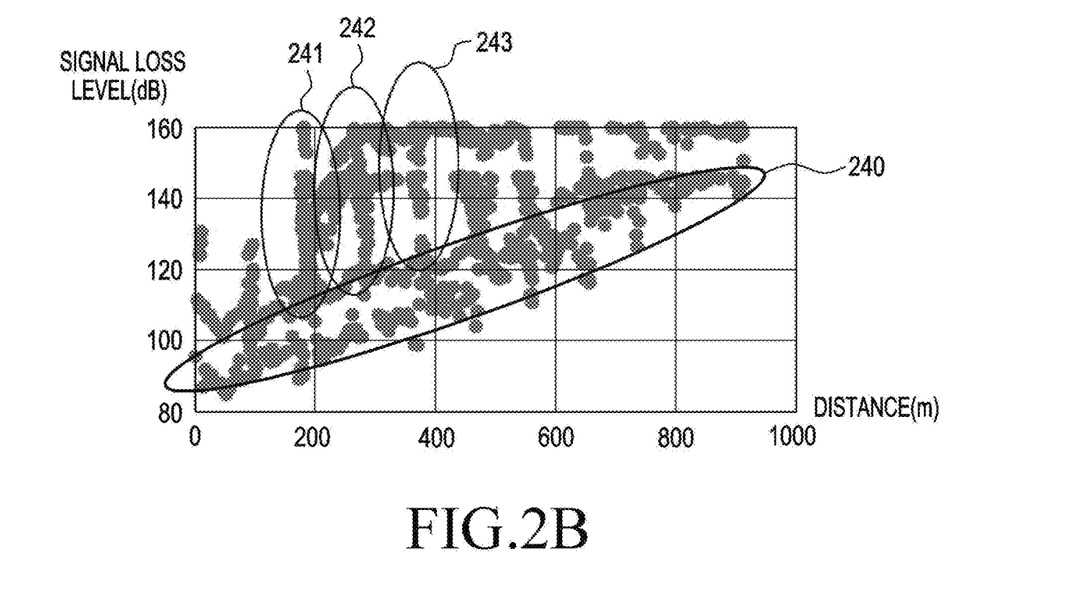

FIGS. 2A and 2B are diagrams illustrating measured data for path loss of rays according to an embodiment of the disclosure.

For the convenience of description, it may be assumed that areas illustrated in FIG. 2A and 2B are identical in morphologies such as natural environments or topographical features except for road distributions or distributions of objects on the ground.

FIG. 2A is a diagram illustrating measured paths of rays in morphology-based effective area analysis of any area according to an embodiment of the disclosure.

FIG. 2B is a graph illustrating path loss data from the ray measurement illustrated in FIG. 2A according to an embodiment of the disclosure.

Referring to FIG. 2A, an effective area 220 may be configured with respect to a BS 210 configured according to an embodiment. The installation position and direction of the BS 210 and the effective area 220 may be configured as described before with reference to FIG. 1B.

In the disclosure, the installation direction of a BS may refer to a direction in which a ray is transmitted by the BS.

In FIG. 2A, signal strengths, that is, signal levels on a main road 230 and a sub-road 231, 232, or 233 are marked with dots.

According to an embodiment of the disclosure, a main road may be a road deployed on a constellation extended from a BS, and a sub-road may be a road connected to the main road, that is, a road forked off from the main road.

In FIG. 2A, an area marked with red dots has higher signal levels, and areas have lower signal levels in the order of orange dots, yellow dots, green dots, light blue dots, blue dots, and purple dots.

Referring to FIG. 2A, it may be noted that red dots are distributed mainly on the main road 230 in the effective area 220, and orange dots, yellow dots, green dots, light blue dots, blue dots, and purple dots are distributed on the sub-roads 231, 232 and 233 forked off from the main road 230.

Therefore, the level of a signal propagated from the BS 210 is lower on the sub-road 231, 232 or 233 than on the main road 230, and signal loss is increased on the sub-road 231, 232 or 233, relative to the main road 230.

Path loss data of rays in the effective area 220 configured in FIG. 2A is plotted on the graph illustrated in FIG. 2B.

In FIG. 2B, reference numeral 240 denotes the loss levels of signals observed along the main road 230 illustrated in FIG. 2A.

Referring to the first signal loss levels 240 in FIG. 2B, dots indicating signal loss levels on the main road 230 are distributed in the form of a straight line, and thus the inclination of the signal loss levels on the main road 230 is almost constant. Therefore, it may be said that a distance from the BS 210 is proportional to a signal loss level on the main road 230 running as one road. That is, it may be noted that as the distance from the BS 210 increases, the signal loss increases at an almost constant rate on the main road 230 extending as one road.

According to another embodiment of the disclosure, in an exceptional case in which a morphology rapidly changes on the same road, the signal loss may not be shown as proportional to the distance as illustrated in FIG. 2B. In this case, according to an embodiment, analysis may be performed by assigning a morphology weight according to a change in the morphology of a corresponding road.

In FIG. 2B, second signal loss levels 241, third signal loss levels 242, and fourth signal loss levels 243 are observed respectively along the first sub-road 231, the second sub-road 232, and the third sub-road 233 illustrated in FIG. 2A.

It may be noted from the second signal loss levels 241, the third signal loss levels 242, and the fourth signal loss levels 243 in FIG. 2B, signal loss values are formed along the sub-roads 231, 232, and 233 forked off from the main road 230 connected to the BS 210.

Further, according to an embodiment of the disclosure, the signal loss may be different according to the position of each sub-road 231, 232, or 233 or a distance from each sub-road 231, 232, or 233.

For example, the signal loss may increase in proportion to the distance from the first sub-road 231, the second sub-road 232, or the third sub-road 233.

As noted from FIG. 2A, morphology-based path loss is generated based on the layout of a road, and different path loss characteristics are observed on different roads, particularly on the main road and the sub-road.

Figure 3:
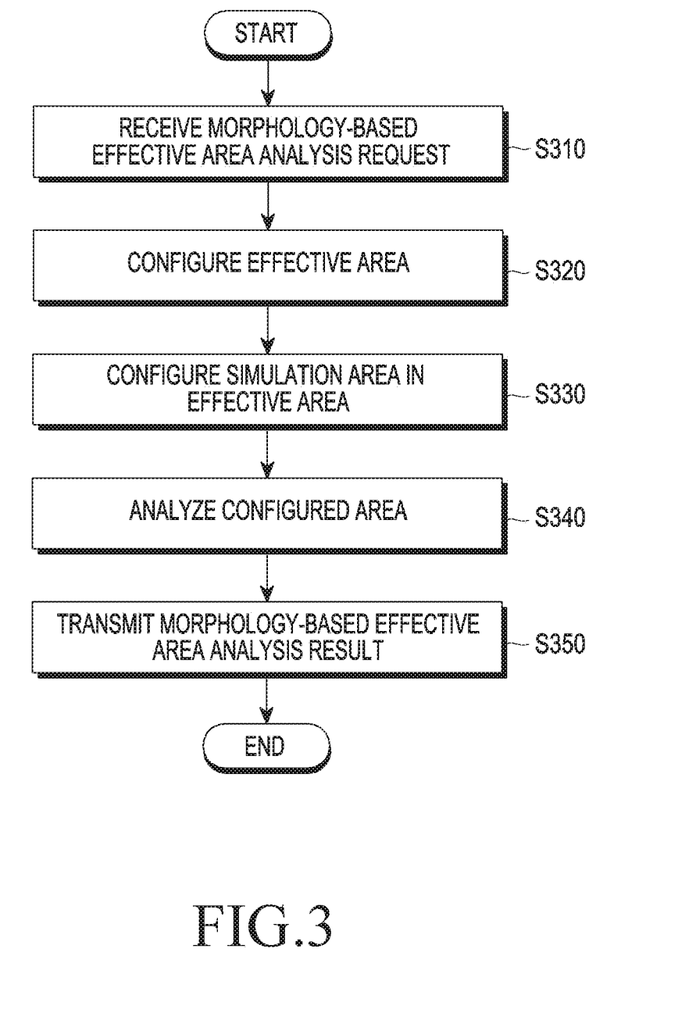
FIG. 3 is a flowchart sequentially illustrating a method of performing a morphology-based effective area analysis method according to an embodiment of the disclosure.

With reference to FIG. 3, a morphology-based effective area analysis method according to an embodiment of the disclosure will be described below.

FIG. 3 is a flowchart sequentially illustrating a method of performing a morphology-based effective area analysis method according to an embodiment of the disclosure.

Upon receipt of a morphology-based effective area analysis request from a user in operation S310, an effective area may be configured for a BS to be analyzed in operation S320.

As described before with reference to FIG. 1A, according to an embodiment, the effective area may be configured based on the scan range of the analysis target, BS.

According to an embodiment of the disclosure, the effective area may be configured as an area in which a dominant one of the signals transmitted by the BS reaches.

According to an embodiment of the disclosure, the effective area may be configured as an area for limiting an analysis range of a target area to be analyzed for a wireless network design.

Once the effective area is configured, a simulation area may be configured in the effective area in operation S330. The simulation area may be configured based on the layout of a main road running on a line extended from the BS.

The simulation area is an area representing a target analysis path, for path analysis of rays transmitted from the BS, which may be configured according to an area in which a road running on a line extended from the BS is deployed.

According to an embodiment of the disclosure, morphology-based effective area analysis may be performed on the simulation area configured in operation S330, in operation S340.

According to an embodiment, the analysis of operation S340 is an analysis of paths of rays in the simulation area.

According to an embodiment, the ray path analysis may be performed by ray path simulation in each area, and ray path analysis results of a similar morphology group prestored in a DB may be applied to the ray path analysis.

According to an embodiment of the disclosure, the results of the morphology-based effective area analysis based on the results of the analysis performed in operation S340 may be transmitted in operation S350.

According to an embodiment of the disclosure, the morphology-based effective area analysis method may be performed for a preset candidate BS list. That is, simulation for a wireless network design may be performed on the preset candidate BS list.

According to an embodiment, when the morphology-based effective area analysis method is performed for the preset candidate BS list, the candidate BS list may include information about the number of installed BSs, the installation position or direction of each BS, and so on for a wireless network design. Further, the information about the installation position or direction of each BS may be configured for a mother BS and all or a part of the virtual BSs in the candidate BS list.

In the disclosure, the installation direction of a BS may refer to a direction in which a ray is transmitted from the BS.

According to an embodiment of the disclosure, a BS list may be built as a DB.

Figure 4:
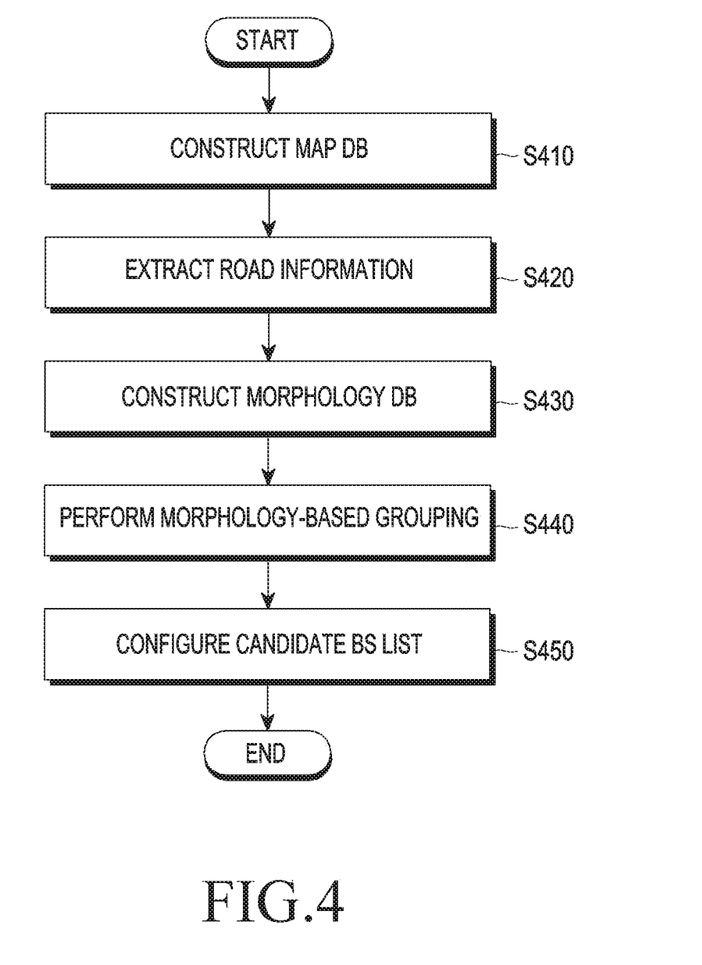
FIG. 4 is a flowchart sequentially illustrating a method of configuring a candidate base station (BS) list according to an embodiment of the disclosure.
Figure 5:
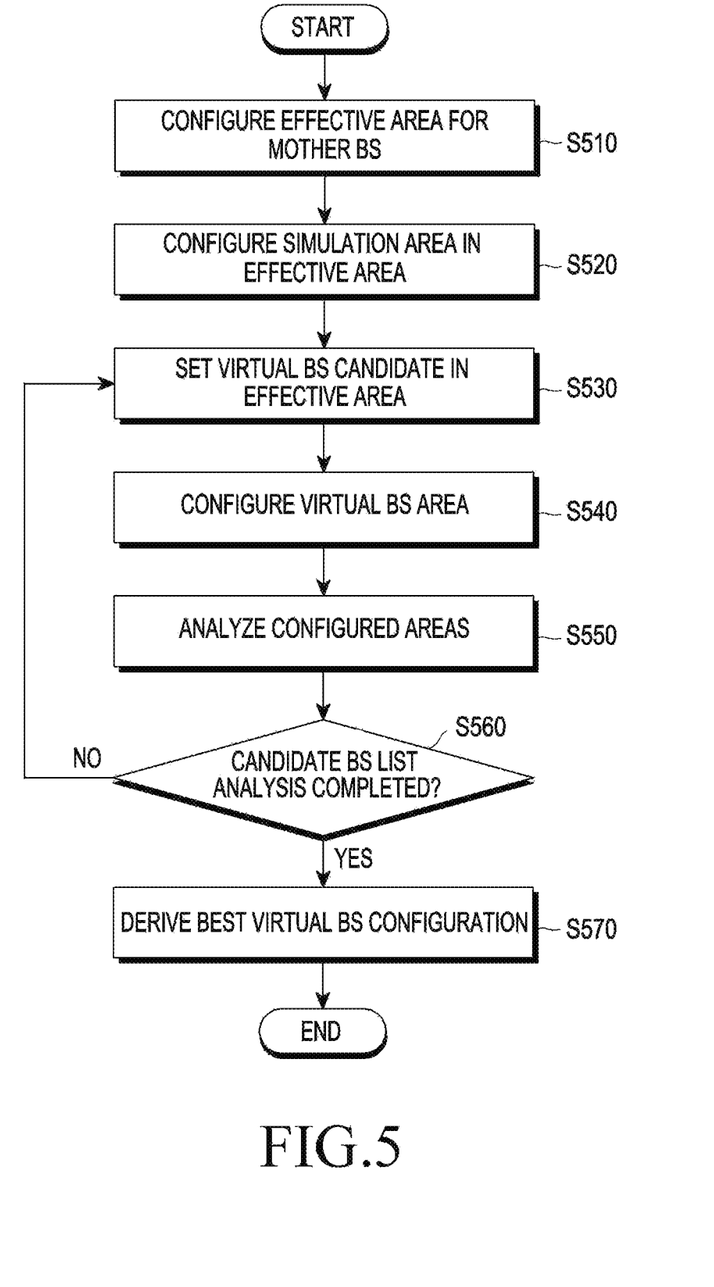
FIG. 5 is a flowchart sequentially illustrating a method of performing a morphology-based effective area analysis method for a preset candidate BS list according to an embodiment of the disclosure.

With reference to FIGS. 4 and 5, a case in which the morphology-based effective area analysis method is performed for a preset candidate BS list will be described below.

FIG. 4 is a flowchart sequentially illustrating a method of configuring a candidate BS list according to an embodiment of the disclosure.

Referring to FIG. 4, a map database (MAP DB) may be constructed to configure a candidate BS list in operation S410.

According to an embodiment, the MAP DB may be constructed with a map or picture which may represent deployment characteristics of roads or objects on the group, or natural environments, such as a vector map, a satellite map, or a satellite picture.

When the MAP DB is constructed, road information about areas included in the MAP DB may be extracted in operation S420, and a morphology DB may be constructed in operation S430.

According to an embodiment, data for neighboring morphology information based on the layout of each road may be stored in the morphology DB.

According to an embodiment of the disclosure, the morphology information per road may be information obtained by reflecting a neighboring morphology per road extracted in operation S420.

When the morphology DB is constructed in operation S430, areas with similar morphologies may be grouped based on the morphology DB in operation S440.

According to an embodiment, the morphology-based grouping may be classification or grouping of areas with similar morphologies by extracting the neighboring morphology information for roads extracted in operation S420. The ambient environment information may be extracted per road based on the morphology DB constructed in operation S430.

Morphology group information resulting from the grouping in operation S440 may be stored in the morphology DB.

According to an embodiment of the disclosure, an importance degree may be set for each group obtained in operation S440, and a different importance degree may be applied to each group.

According to an embodiment of the disclosure, a ray path analysis result for each group may additionally be stored in the morphology DB. If there is a change in objects on the ground, topographical features, or an ambient environment in each area, morphology information about the area may be updated.

The per-group ray path analysis results stored in the morphology DB may be reflected in analysis results of the same or similar groups.

Specifically, if a first area to be analyzed and a second area on which ray path analysis has already been performed have the same or similar morphology information, the ray path analysis result of the second area, which is pre-stored in the morphology DB, may be applied to ray path analysis of the first area, thereby shortening time taken for analysis and thus increasing analysis efficiency.

If areas with similar morphologies are grouped in operation S440, a candidate BS list may be configured based on the morphology-based groups, for a wireless network design in operation S450.

FIG. 5 is a flowchart sequentially illustrating a method of performing a morphology-based effective area analysis method for a preset candidate BS list according to an embodiment of the disclosure.

Referring to FIG. 5, the candidate BS list may include candidates for BSs for a wireless network design, and the number of the BSs for the wireless network design may be preset.

According to an embodiment of the disclosure, a wireless network design may be performed for the case where a plurality of BSs are installed as well as for the case where one BS is installed. For example, a wireless network design may be performed with a combination of one mother BS and a plurality of virtual BSs.

Therefore, repeated analysis may be performed by changing a list of candidate BSs according to the preset number of BSs in the effective area analysis method according to an embodiment of the disclosure.

According to another embodiment, repeated analysis may be performed by changing all of the number of BSs, the list of candidate BSs, and the installation position of a mother BS.

While the number of BSs and the position of a mother BS are preset in the illustrated case of FIG. 5, for the convenience of description, the number of BSs or the position of a mother BS may not be preset in the candidate BS list according to an embodiment of the disclosure.

An effective area may first be configured with respect to the preset mother BS in the candidate BS list in operation S510.

As described before with reference to FIG. 1, the effective area according to an embodiment may be configured based on the scan range of the mother BS.

According to an embodiment of the disclosure, the effective area may be configured as an area in which a dominant one of the signals transmitted by the BS reaches.

According to an embodiment of the disclosure, the effective area may be configured as an area for limiting an analysis range of a target area to be analyzed for a wireless network design.

Once the effective area is configured, a simulation area may be configured in the effective area in operation S520.

The simulation area may be configured based on the layout of a main road running on a line extended from the mother BS.

The simulation area is an area representing a target path for analysis of paths of rays transmitted by the BS, and may be configured according to an area in which a road runs on the line extended from the BS.

After the simulation area is configured, the positions of virtual BS candidates are set in the effective area in operation S530, and virtual BS areas may be configured for the virtual BS candidates in operation S540.

According to an embodiment, the virtual BS candidates may be included in the candidate BS list.

According to an embodiment of the disclosure, the virtual BS candidates may be formed based on the layout of a main road in the simulation area, and the layouts of sub-roads forked off from the main road.

Specifically, the installation positions of the virtual BSs may be set based on points where the sub-roads are forked off from the main road.

According to an embodiment, the virtual BS areas may be target virtual BS analysis areas for analysis of paths of rays transmitted by the virtual BSs.

According to an embodiment, the virtual BS areas 151, 152, and 153 may be configured in consideration of the installation positions or directions of the virtual BSs, and based on roads running on lines extended from the virtual BSs.

According to an embodiment of the disclosure, ray path analysis may be performed for the configured effective area, simulation area, virtual BS areas, or all of the areas in operation S550.

According to an embodiment, the ray path analysis may be performed through ray path simulation on each area, and simulation results of a similar morphology group pre-stored in a morphology DB may be applied to the ray path analysis.

Upon completion of analysis for one BS combination of a mother BS and virtual BSs related to the mother BS in operations S510 to S550, it may be determined whether case analysis has been completed for various BS combinations of the BSs included in the candidate BS list in operation S560.

According to an embodiment of the disclosure, repeated analysis may be performed by combining the candidate BSs included in the candidate BS list in various manners. For example, operations S530 to S550 may be performed for each of a plurality of virtual BS combinations. Herein, the combinations of virtual BS candidates may be configured from the candidate BS list. Various combinations of virtual BS candidates mean that various combinations of the positions of the virtual BS candidates are configured.

If it is determined in operation S560 that case analysis has been completed for various BS combinations of the BSs included in the candidate BS list, an optimum virtual BS configuration may be derived from among the analyzed BS combinations in operation S570.

According to an embodiment, the optimum virtual BS configuration may be a combination of virtual BSs which offers wide service coverage with a small number of BSs or a combination of virtual BSs which enables a signal with the best quality to reach a target area to be serviced, as a result of analysis in operations S530 to S550.

According to another embodiment, the optimum virtual BS configuration may be a combination of virtual BSs that most matches a morphology design criterion set for a wireless network design.

According to another embodiment of the disclosure, if none of the positions of a mother BS and virtual BSs are configured, operations S510 to S560 of FIG. 5 may be performed repeatedly for different positions of a mother BS and virtual BS candidates.

According to another embodiment of the disclosure, if the installation direction of the mother BS is not configured, operations S510 to S560 of FIG. 5 may be performed repeatedly for different directions of the mother BS.

According to the disclosure, the installation direction of a BS may be a direction in which a ray is transmitted from the BS.

According to an embodiment of the disclosure, the number of BSs may not be preset. In this case, operations S510 to S560 of FIG. 5 may be performed repeatedly for different numbers of BSs, such that the best number of BSs and the best configuration of a mother BS and virtual BSs are derived.

Figure 6:
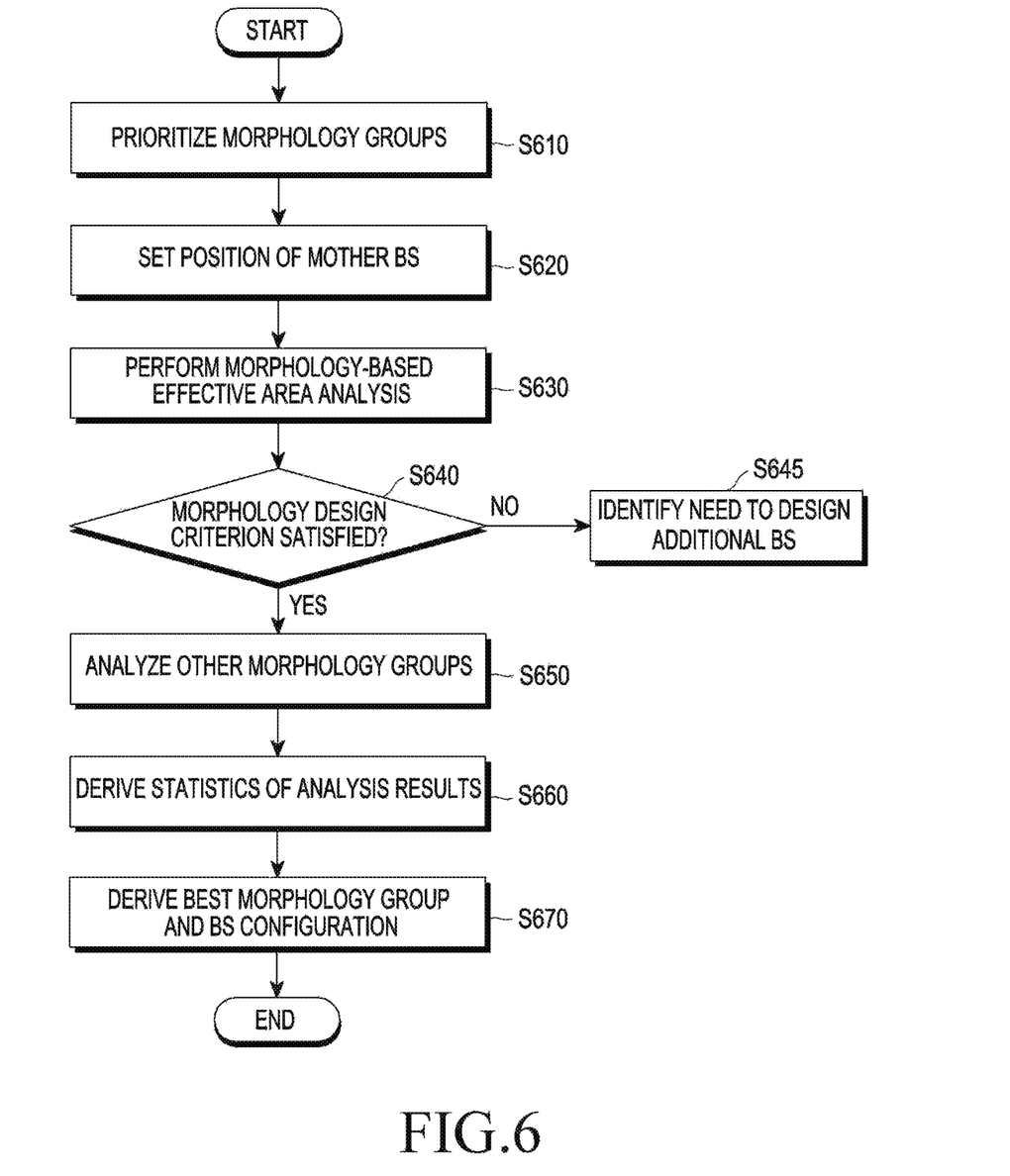
FIG. 6 is a flowchart sequentially illustrating a method of performing a morphology-based effective area analysis method in the case where a candidate BS list is not configured according to an embodiment of the disclosure.

Now, a description will be given of a case in which a morphology-based effective area analysis method is performed when a candidate BS list is not configured.

FIG. 6 is a flowchart sequentially illustrating a method of performing a morphology-based effective area analysis method when a candidate BS list is not pre-configured according to an embodiment of the disclosure.

According to an embodiment, if a candidate BS list is not configured, morphology groups in a morphology DB may be prioritized in operation S610.

The priority levels of the morphology groups may represent the installation feasibility levels of BSs based on the morphology characteristics of a target area for a wireless network design, that is, features such as topographical features, a natural environment, or the layout of objects on the ground.

According to an embodiment of the disclosure, the priority levels of the morphology groups may be set according to the importance degrees of the respective morphology groups, pre-stored in the morphology DB, and may be determined according to a prioritization rule pre-stored in the morphology DB.

The position of a mother BS may be set based on the priority levels of the morphology groups, set in operation S610, in operation S620, and the morphology-based effective area analysis method may be performed for the mother BS in operation S630.

According to an embodiment, the morphology-based effective area analysis method may be performed for a single BS or for a combination of a mother BS and one or more virtual BSs in operation S630.

It may be determined whether a corresponding morphology group satisfies a morphology group design criterion based on the analysis result of operation S630 in operation S640.

The morphology group design criterion may be a wireless network design criterion according to an embodiment of the disclosure.

According to an embodiment, it may be determined whether the morphology group satisfies the morphology group design criterion by comparing the preset wireless network design criterion with the analysis result of operation S630.

If the analysis result does not satisfy the morphology design criterion in operation S640, it may be concluded that an additional BS needs to be designed in operation S645. According to an embodiment, the result derived in operation S645 may be transmitted to a UE and thus notified to a user.

If the analysis result satisfies the morphology design criterion in operation S640, the analysis result of operation S630 may be stored, and other morphology groups may be analyzed in operation S650.

According to an embodiment, the other morphology groups may be analyzed in an order determined based on the priority levels set in operation S610, in operation S650.

According to an embodiment of the disclosure, statistics of the analysis results of operations S610 to S650 may be calculated on a morphology group basis in operation S660.

The statistics may be derived by repeatedly analyzing ray paths according to the characteristics of each morphology group in operation S660.

The best morphology group and the best BS configuration for the corresponding morphology group may be derived based on the statistics derived in operation S660, in operation S670.

According to an embodiment, the BS configuration derived in operation S670 may include one or more of a combination of a mother BS and one or more virtual BSs, the installation positions of the mother BS or the virtual BSs, or the installation directions of the mother BS or the virtual BSs.

As described before, rays transmitted by a BS may be propagated in a different path according to the installation direction of the BS. In the disclosure, the installation direction of the BS may be a direction in which a ray is transmitted from the BS.

According to an embodiment, the best morphology group and the best BS configuration for the corresponding morphology group may be a combination of virtual BSs which offers wide service coverage with a small number of installed BSs or which enables a signal with the best quality to reach a target area to be serviced, as a result of the analysis in operations S610 to S660.

According to another embodiment, the best morphology group and the best BS configuration for the corresponding morphology group may be a combination of virtual BSs, which most matches a morphology design criterion set for a wireless network design according to an embodiment of the disclosure.

Figure 7:
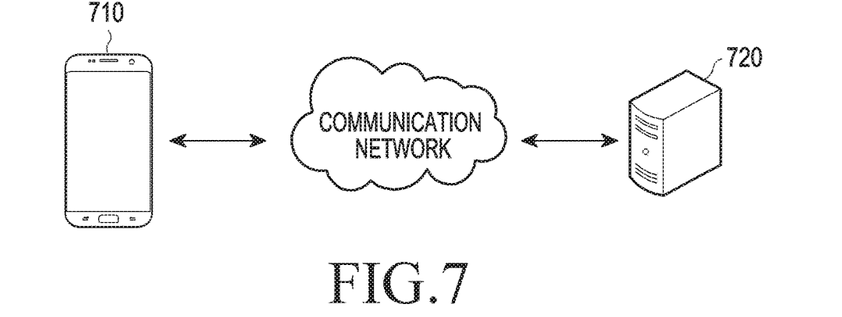
FIG. 7 is a block diagram illustrating a configuration of a morphology-based effective area analysis system according to an embodiment of the disclosure.

FIG. 7 is a block diagram of a morphology-based effective area analysis system according to an embodiment of the disclosure.

Referring to FIG. 7, the morphology-based effective area analysis system may include an electronic device 710 and a server 720, which are capable of communicating with each other through a communication network.

The communication network may be configured irrespective of communication specifications such as wired or wireless communication.

For example, the wireless communication may include cellular communication conforming to at least one of long-term evolution (LTE), code division multiple access (CDMA), global system for mobile communication (GSM), or $5^{th}$ generation (5G) communication. Further, the wireless communication may include wireless fidelity (Wi-Fi), Bluetooth, and so on, which are short-range communication. Additionally, the wired communication may include, for example, universal serial bus (USB), high-definition multimedia interface (HDMI), power line communication, and so on.

According to an embodiment of the disclosure, each of the electronic device 710 and the server 720 may be any of communicable devices including at least one of a smartphone, a tablet PC, a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (for example, a head-mounted device (HMD) such as electronic glasses, electronic clothes, an electronic bracelet, an electronic necklace, an electronic accessory, an electronic tattoo, or a smart watch).

According to an embodiment of the disclosure, the electronic device 710 may transmit a morphology-based effective area analysis request to the server 720, and receive results of the requested analysis from the server 720. Further, the electronic device 710 may provide the analysis results received from the server 720 to a user on a screen.

Besides, according to an embodiment, the electronic device 710 may request various DBs, information, lists, or area configuration information as described before with reference to FIGS. 1A to 6 to the server 720, and receive the various DBs, information, lists, or area configuration information from the server 720.

According to an embodiment of the disclosure, the electronic device 710 may request a change of configuration information or a parameter for each operation described before with reference to FIGS. 4 to 6 to the server 720.

According to an embodiment of the disclosure, the server 720 may construct a MAP DB or a morphology DB. Upon receipt of the morphology-based effective area analysis request from the electronic device 710, the server 720 may perform simulation of ray paths or DB-based analysis.

According to an embodiment, the server 720 may transmit various DBs, information, lists, area configuration information, or analysis results as described before with reference to FIGS. 4 to 6 to the electronic device 710.

Figure 8:
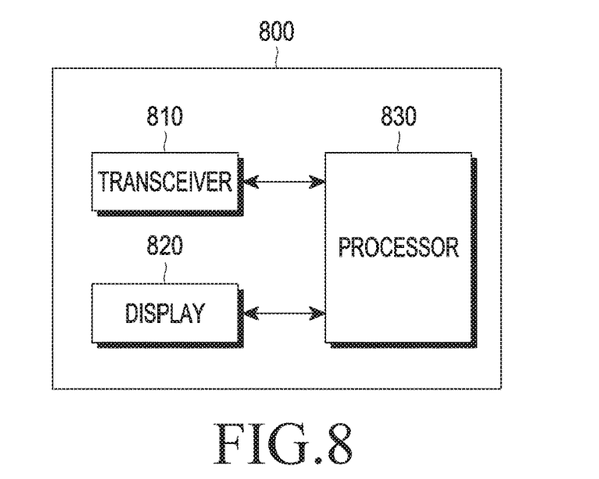
FIG. 8 is a block diagram of an electronic device according to an embodiment of the disclosure.

FIG. 8 is a block diagram of an electronic device 800 according to an embodiment of the disclosure.

Referring to FIG. 8, the electronic device 800 may include a transceiver 810, a display 820, and a processor 830. The components are not essential. That is, a module may be added to or omitted from the components.

For example, according to another embodiment of the disclosure, components other than the processor 830 may be separated from the electronic device 800 and operate in conjunction with the electronic device 800.

The transceiver 810 of the electronic device 800 may transmit and receive signals to and from a server or another device. The display 820 may display a screen so as to display results of a morphology-based effective area analysis. Further, the processor 830 may provide overall control to the operations of the electronic device 800.

According to the disclosure, all techniques or methods performed in the electronic device 800 may be understood as performed under the control of the processor 830. However, the transceiver 810 and the processor 830 may not necessarily be configured separately but incorporated into one component such as a single chip.

Figure 9:
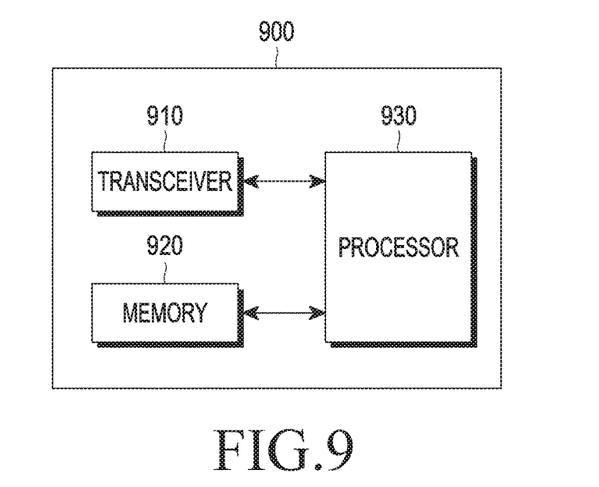
FIG. 9 is a block diagram of a server according to an embodiment of the disclosure.

FIG. 9 is a block diagram of a server 900 according to an embodiment of the disclosure.

Referring to FIG. 9, the server 900 may include a transceiver 910, a memory 920, and a processor 930. The components are not essential. A module may be added to or omitted from the components.

For example, according to another embodiment of the disclosure, components other than the processor 930 may be separated from the server 900 and operate in conjunction with the server 900.

The transceiver 910 of the server 900 may transmit and receive signals to and from an electronic device or another server. The memory 920 may store various types of information and build a DB. The processor 930 may provide overall control to the operations of the server 900.

According to the disclosure, all techniques or methods performed in the server 900 may be understood as performed under the control of the processor 830. However, the transceiver 910, the memory 920, and the processor 930 may not necessarily be configured separately but incorporated into one component such as a single chip.

As is apparent from the foregoing description, the morphology-based effective area analysis method according to an embodiment of the disclosure may shorten analysis time taken for simulation for wireless network design. Therefore, analysis of various cases of wireless network designs may be enabled, thereby leading to efficient analysis.

According to an embodiment of the disclosure, as analysis is repeatedly performed in consideration of the installation positions, installation directions, or number of BSs in each of various cases, various cases of wireless network designs are considered, and thus optimized BS deployment is derived.

According to an embodiment of the disclosure, as similar morphologies are grouped and a morphology database is built with the morphology groups, data about a stored similar morphology group is applied to a target analysis area. Therefore, the economic feasibility of analysis may be increased.

Further, the morphology-based database may be used for various purposes in analyzing a wireless network design.

The method flowcharts, system block diagram, and apparatus block diagrams illustrated in FIGS. 1A to 9 are not intended to limit the scope of the disclosure. That is, the components or operations described with reference to FIGS. 1A to 9 should not be interpreted as essential for implementation of the disclosure, and the disclosure may even be implemented only with some components without departing the scope and spirit of the disclosure.

Various embodiments of the disclosure and terms used herein are described with reference to the accompanying drawings. However, the scope of the disclosure is not intended to be limited to the particular embodiments, and it is to be understood that the disclosure covers various modifications, equivalents, and/or alternatives falling within the scope and spirit of the disclosure. With regard to the description of the drawings, similar reference numerals may be used to refer to similar elements. It is to be understood that singular forms include plural referents unless the context clearly dictates otherwise. As used herein, each of such phrases as "A or B", "at least one of A and/or B", "A, B or C", or "at least one of A, B and/or C" may include all possible combinations of the items enumerated together in a corresponding one of the phrases. The term as used in the disclosure, "$1^{st}$", "$2^{nd}$", "first" or 'second' may be used for the names of various components irrespective of sequence or importance, not limiting the components. These expressions are used to distinguish one component from another component. For example, when it is said that a component (e.g., a first component) is "operatively or communicatively coupled with/to" or "connected to" another component (e.g., a second component), it should be understood that the one component is connected to the other component directly or through any other component (e.g., a third component).

The term "module" as used herein may include its ordinary meaning including a hardware, software, or firmware unit. The term "module" may be used interchangeably with terms such as logic, logical block, component or circuit. A module may be the smallest unit of an integrated part or a portion thereof. A module may be the smallest unit for performing one or more functions, or a portion thereof. For example, a module may include an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a computer). The machine is a device capable of invoking an instruction stored in the storage medium, and executing it according to the instruction. The machine may include a UE. If the instruction is executed by a processor, the processor may execute a function corresponding to the instruction with or without using one or more other components under the control of the processor. The instruction may include a code generated by a compiler or a code executable by an interpreter.

The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for wireless network design, the method comprising:
   receiving a ray path analysis request for a target area for a wireless network design;
   configuring a first area corresponding to an analysis range of the target area, in consideration of a position of a first base station (BS) and a direction of a ray transmitted by the first BS;
   configuring a second area along a layout of a first road running on a line extended from the first BS, within a range of the configured first area;
   performing analysis on a path of the ray transmitted by the first BS in the second area; and
   transmitting a result of the analysis.

2. The method of claim 1, wherein the first area is configured based on an area in which a dominant signal of the ray transmitted by the first BS reaches.

3. The method of claim 1, further comprising:
   re-performing the configuration of the first area, the configuration of the second area, and the analysis of the path of the ray by re-configuring the position of the first BS or the direction of the ray transmitted by the first BS to be different.

4. The method of claim 1, further comprising:
   configuring a position of the second BS and a direction of a ray transmitted by the second BS, along the second area;
   configuring a third area for analysis on a path of the ray transmitted by the second BS, in consideration of the position of the second BS and the direction of the ray transmitted by the second BS; and
   performing analysis on the path of the ray transmitted by the second BS in the third area,
   wherein the position of the second BS is determined based on a layout of a second road connected to the first road and forked off from the first road.

5. The method of claim 4, wherein the third area is configured based on an area in which a dominant signal of the ray transmitted by the second BS reaches.

6. The method of claim 4, further comprising:
   re-configuring the third area and re-performing analysis of the path of the ray by re-configuring the position of the second BS or the direction of the ray transmitted by the second BS to be different.

7. The method of claim 4, further comprising:
   constructing a map database based on at least one of a vector map, a satellite map, or a satellite picture;
   extracting road information from the map database;
   constructing a morphology database by calculating neighboring morphology information per extracted road information; and
   generating morphology group information by grouping similar morphologies into one group based on the morphology database.

8. The method of claim 7, further comprising:
   storing the result of the analysis for the target area in the morphology database based on morphology group information of the target area for the wireless network design.

9. The method of claim 7, wherein the performing of analysis on the path of the ray in the second area comprises:
   performing simulation for tracing a ray path within a range of the second area, or
   extracting a result of analysis performed for the same morphology group as for the second area from the morphology database, and applying the extracted analysis result as an analysis result of the second area.

10. The method of claim 7, wherein the performing of analysis on the path of the ray in the third area comprises:
    performing simulation for tracing a ray path within a range of the third area, or extracting a result of analysis performed for the same morphology group as for the third area from the morphology database, and applying the extracted analysis result as an analysis result of the third area.

11. The method of claim 7, further comprising:
generating a candidate BS list based on the morphology group information;
setting different combinations of the first BS and second BSs from a plurality of BSs included in the candidate BS list, and performing analysis on each of the combinations; and
determining one of the combinations based on results of analysis on the combinations, for the wireless network design.

12. An electronic device for performing a wireless network design, the electronic device comprising:
a transceiver;
a memory; and
at least one processor electrically coupled to the transceiver and the memory,
wherein the at least one processor is configured to:
receive a ray path analysis request for a target area for the wireless network design through the transceiver,
configure a first area corresponding to an analysis range of the target area, in consideration of a position of a first base station (BS) and a direction of a ray transmitted by the first BS,
configure a second area along a layout of a first road running on a line extended from the first BS, within a range of the configured first area, to perform
analysis on a path of the ray transmitted by the first BS in the second area, and transmit a result of the analysis through the transceiver.

13. The electronic device of claim 12, wherein the first area is further configured based on an area in which a dominant signal of the ray transmitted by the first BS reaches.

14. The electronic device of claim 12,
wherein the at least one processor is further configured to:
configure a position of the second BS and a direction of a ray transmitted by the second BS, along the second area,
configure a third area for analysis on a path of the ray transmitted by the second BS, in consideration of the position of the second BS and the direction of the ray transmitted by the second BS, and
perform analysis on the path of the ray transmitted by the second BS in the third area, and
wherein the position of the second BS is determined based on a layout of a second road connected to the first road and forked off from the first road.

15. The electronic device of claim 14, wherein the at least one processor is further configured to:
re-configure the third area; and
re-perform analysis of the path of the ray by re-configuring the position of the second BS or the direction of the ray transmitted by the second BS to be different.

16. The electronic device of claim 14, wherein the at least one processor is further configured to:
construct a map database through the memory based on at least one of a vector map, a satellite map, or a satellite picture;
extract road information from the map database;
construct a morphology database through the memory by calculating neighboring morphology information per extracted road information; and
generate morphology group information by grouping similar morphologies into one group based on the morphology database.

17. The electronic device of claim 16, wherein the result of the analysis for the target area is stored in the morphology database based on morphology group information of the target area for the wireless network design.

18. The electronic device of claim 16, wherein the at least one processor is further configured to:
perform morphology-based effective area analysis on the second area in a method of performing simulation for tracing a ray path within a range of the second area, or a method of extracting a result of analysis performed for the same morphology group as for the second area from the morphology database; and
applying the extracted analysis result as an analysis result of the second area.

19. The electronic device of claim 16, wherein the at least one processor is further configured to:
perform morphology-based effective area analysis on the third area in a method of performing simulation for tracing a ray path within a range of the third area, or a method of extracting a result of analysis performed for the same morphology group as for the third area from the morphology database; and
applying the extracted analysis result as an analysis result of the third area.

20. A non-transitory computer-readable recording medium having an executable program recorded thereon for performing a wireless network design method, wherein the program, when executed by a computer, instructs the computer to perform:
receiving a ray path analysis request for a target area for a wireless network design;
configuring a first area corresponding to an analysis range of the target area, in consideration of a position of a first base station (BS) and a direction of a ray transmitted by the first BS;
configuring a second area along a layout of a first road running on a line extended from the first BS, within a range of the configured first area;
performing analysis on a path of the ray transmitted by the first BS in the second area; and
transmitting a result of the analysis.

* * * * *